Patented May 23, 1950

2,508,787

UNITED STATES PATENT OFFICE 2,508,787

DICHLORO ALUMINUM AMINOACETATE HYDRATE DEODORANT COMPOSITION

Irvine W. Grote and James M. Holbert, Chattanooga, Tenn., assignors to The Chattanooga Medicine Company, Chattanooga, Tenn., a corporation of Tennessee No Drawing. Application July 8, 1948,
Serial No. 37,524

3 Claims. (Cl. 167—90)

This invention relates to a novel aluminum compound and a method of preparing the same.

In particular, this invention relates to hydrated dichloro aluminum aminoacetate, and a method for preparing the same.

One object of the present invention is the preparation of novel aluminum compounds especially adapted for use in deodorant compositions. By "deodorant compositions" we refer to those compositions which act to retard or inhibit the flow of perspiration from the skin.

In the past, various compositions have been proposed as deodorant and perspiration retarding agents. These compositions normally contain substances such as free aluminum chloride or aluminum sulfate. The objection to these compounds lies in the fact that they irritate the skin and destroy clothing since salts of this nature, being reaction products of a strong acid and a weak base, hydrolyze when in contact with moisture to yield a free acid such as hydrochloric or sulfuric acid.

It is an object of this invention to prepare a deodorant composition containing an aluminum compound which does not irritate the skin or cause rotting of clothing.

It is a further object of this invention to prepare deodorant compositions which are substantially free from skin-irritating aluminum compounds such as free aluminum chloride.

We have now found that an aluminum compound hitherto unknown, namely, dichloro aluminum aminoacetate hydrate,

is remarkably suitable for use in a deodorant composition.

We have prepared our new compound by two different methods. In one method of preparation, we react one molecular proportion of aluminum chloride with at least one, and preferably two, molecular proportions of sodium aminoacetate, otherwise known as sodium glycinate, in the presence of water at approximately room temperature, and separate out a compound which we have identified as a dichloro aluminum aminoacetate hydrate. The reaction proceeds according to the following equation:

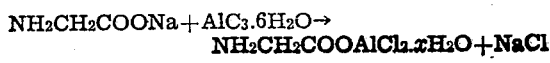

The preparation may be carried out in such a manner that sodium chloride is precipitated, thus confirming the chemical composition of our new compound.

Another method for the preparation of our new compound involves reacting aluminum dihydroxy aminoacetate with concentrated hydrochloric acid at a temperature less than 100° C., preferably less than 50° C.

The reaction product of the present invention sets to a jelly-like consistency in the presence of water. The reaction product itself is a white, hygroscopic, amorphous solid, which dissolves in an equal weight of water and returns slowly to its original gel form. The gel has a pH within the range from about 2.5 to about 4.0, and normally will lie within the range from 3.0 and 3.5. The reaction product has no definite melting point, but at a temperature of approximately 180° C. a physical change occurs evidenced by a whitening and swelling of the powder. This phenomenon is probably due to the loss of water. The compound begins to decompose at a temperature of about 260° C.

The reaction product of the present invention contains less than ten per cent by weight of aluminum chloride, and normally will contain less than two per cent free aluminum chloride. The dichloro aluminum aminoacetate jelly may be used per se as a deodorant, but we prefer to compound it with a suitable cosmetic base. We have found that gum tragacanth, petrolatum, glyceryl monoesters such as glyceryl monolaurate, glyceryl monostearate, and the like, are suitable carriers for the gelatinous product. The proportions of carrier to dichloro aluminum aminoacetate hydrate may vary over a wide range, suitable compositions being obtained in the ranges of 1 to 10 parts by weight of carrier to one part of the dichloro aluminum aminoacetate hydrate. A preferred composition comprises 8 to 9 parts of dichloro aluminum aminoacetate hydrate to 10 parts of carrier or cosmetic base.

It is also within the scope of our invention to use the dichloro aluminum aminoacetate hydrate as a liquid product, such as in water or in solution in an organic solvent. The deodorant product may further contain coloring and/or perfuming material.

To further illustrate the preparation of the novel compound of our invention, the following examples are submitted.

EXAMPLE I

Sodium glycinate was prepared by adding 37.5 gms. glycine to 20 gms. sodium hydroxide dissolved in 20 cc. distilled water. This solution was then added slowly to a solution of 120 gms. aluminum chloride hexahydrate dissolved in enough water to give a solution volume of 180 cc. On standing overnight the mixture produced a thick gel with a pH of 3.5.

To illustrate that the aluminum chloride had reacted to form a new compound, the reaction product was taken to dryness and extracted with absolute alcohol. Only 1.7% of the total amount of aluminum chloride originally present was extracted.

EXAMPLE II

One hundred cc. of a solution of sodium glycinate and aluminum chloride in approximately equimolar proportions were subjected to dialysis by being placed in a collodion bag and suspended in running water until the wash water gave a negative test for chloride ion. The contents of the bag was then transferred to a flask and taken to dryness at reduced pressure and a temperature not exceeding 50° C. The dried material when redissolved in water gave a pH reading of 3.50. One gm. of the material was soluble in 1 cc. of distilled water, and the solution on standing returned to its original gel form.

Analysis of the dried material for chlorine and nitrogen gave the following results:

Table

| | Found | Calculated for $NH_2CH_2COOAl(Cl)_2 \cdot 6H_2O$ |
|---|---|---|
| Chlorine | 30.95 | 25.36 |
| Nitrogen | 4.80 | 5.00 |

From the results, it is apparent that the sodium chloride was incompletely removed from the sample, giving a high chlorine value and a low nitrogen value.

EXAMPLE III 255 cc. of 95% ethanol were added in successive portions to 55 cc. of a solution of aluminum chloride and sodium glycinate, in equimolar proportions. Salt was removed by filtration after each addition of alcohol. The filtrate from this process was evaporated to dryness at reduced temperature and pressure to give a low yield of product. The dried material contained 31.2% chlorine and 4.80% nitrogen, showing that the sodium chloride was incompletely removed. One gram of the material was soluble in 1 cc. of distilled water, and set to a gel on standing. The pH of the water solution was 3.5.

EXAMPLE IV 76.4 grams of dihydroxy aluminum aminoacetate containing 11.6% moisture were added slowly to 83 cc. of hydrochloric acid containing 36.5 g. of HCl. Since the reaction is quite exothermic, external cooling was used to keep the temperature below about 50° C. On standing over night the material formed a thick gel with a pH of 2.78. The material was stirred to break up the gel and evaporated to dryness at reduced pressure and a temperature below 50° C. The yield was 119 gms. as compared to the theoretical yield of 113 gms. One gram of the material was soluble in 1 cc. of distilled water.

Assay of the dried material gave the following results:

| | Found | Calculated for $NH_2CH_2COOAl(Cl)_2 \cdot 6H_2O$ |
|---|---|---|
| Chlorine | 28.32 | 25.36 |
| Nitrogen | 5.25 | 5.00 |
| Aluminum | 10.04 | 9.64 |

Further evidence of the structure may be obtained by calculating the atomic ratios of chlorine, nitrogen and aluminum. In pure dichloro aluminum aminoacetate the ratio would be 2:1:1. Calculations of the atomic ratios on the product as prepared above showed a ratio of $$0.791:0.375:0.373$$

which corresponds closely to the theoretical ratio.

The foregoing examples have indicated the hexahydrate of dichloro aluminum aminoacetate as being the ultimate reaction product. It is to be emphasized that while the average composition corresponds to the hexahydrate, non-crystalline compounds of this type usually contain a mixture of several other hydrates beside the hexahydrate. It is obvious that the number of molecules of water contained in the hydrate may vary with the drying temperature and other drying conditions employed.

The foregoing examples are merely illustrative and should not be construed as limiting the broad scope of this invention, otherwise than as necessitated by the appended claims.

We claim as our invention:
1. A dichloro aluminum aminoacetate hydrate.
2. A dichloro aluminum aminoacetate hexahydrate.
3. A deodorant composition comprising a dichloro aluminum aminoacetate hydrate containing less than 10% by weight of free aluminum chloride and a tragacanth base.

IRVINE W. GROTE.
JAMES M. HOLBERT.

REFERENCES CITED

The following references are of record in the file of this patent:

UNITED STATES PATENTS

| Number | Name | Date |
|---|---|---|
| 2,145,583 | Carlson | Jan. 31, 1939 |
| 2,236,387 | Wallace | Mar. 25, 1941 |
| 2,368,075 | Wampner | Jan. 23, 1945 |
| 2,412,535 | Richardson | Dec. 10, 1945 |

OTHER REFERENCES

Chem. Abstracts, vol. 31 (1937), col. 1768, abstract of original paper by Dubsky et al.

Chem. Abstracts, vol. 40 (1946), col. 4614, abstract of original paper by Volshtein.

British Chem. Abstracts, pt. A (1934), page 445, abstract of original paper by Kisch et al.

Krantz: Journal of Pharmacology, vol 82 (1944) pages 247–253.